United States Patent [19]
Lenti et al.

[11] Patent Number: 5,948,478
[45] Date of Patent: Sep. 7, 1999

[54] PROCESS FOR THE PROTECTION OF STONY OR COATING SURFACES

[75] Inventors: Daria Lenti, Alessandria; Roberta Marchetti, Pavia; Stefano Turri, Milan, all of Italy

[73] Assignee: Ausimont S.P.A., Milan, Italy

[21] Appl. No.: 08/638,135

[22] Filed: Apr. 26, 1996

[30] Foreign Application Priority Data

Apr. 28, 1995 [IT] Italy .................................. MI95A0855

[51] Int. Cl.$^6$ ...................................................... B05D 3/02
[52] U.S. Cl. ...................... 427/384; 427/385.5; 528/401; 528/402
[58] Field of Search ................................... 528/401, 402; 427/384, 385.5

[56] References Cited

U.S. PATENT DOCUMENTS

| | | | |
|---|---|---|---|
| 2,242,218 | 5/1941 | Auer | 91/70 |
| 3,665,041 | 5/1972 | Sianesi et al. | 260/615 |
| 3,715,378 | 2/1973 | Sianesi et al. | 260/463 |
| 3,810,874 | 5/1974 | Mitsch et al. | 260/75 |
| 4,478,975 | 10/1984 | Dessaint et al. | 524/871 |

FOREIGN PATENT DOCUMENTS

| | | |
|---|---|---|
| 0 148 482 | 7/1985 | European Pat. Off. . |
| 0 239 123 | 9/1987 | European Pat. Off. . |
| 0 665 253 | 8/1995 | European Pat. Off. . |
| 0 695 772 | 7/1996 | European Pat. Off. . |
| 20 66 042 | 11/1979 | Germany . |
| 1161595 | 3/1987 | Italy . |
| 1233420 | 3/1992 | Italy . |

OTHER PUBLICATIONS

Trends in Polymer Science, "Developments in Fluoropolymer Coatings", Scheirs et al., vol. 3, No. 3, Mar. 1995, UK, pp. 74–82.

Chemical Abstracts, 123:343487v, "Fluorinated Resins For Low Solvent Paints", Locapsi et al., vol. 123, No. 26, Dec. 25, 1995.

Angewandte Makromolekulare Chemie, "Synthesis and Characterization of Low–Viscosity Fluoropolyether–Based Segmented Oligomers", Scicchitano et al., vol. 231, No. 4000, Sep. 1995, pp. 47–60.

*Primary Examiner*—Randy Gulakowski
*Attorney, Agent, or Firm*—Finnegan, Henderson, Farabow, Garrett & Dunner, L.L.P.

[57] ABSTRACT

A method of protecting objects from graffiti using fluorinated polymers based on fluoropolyethers in a dry formulation wherein the fluorinated polymer includes a fluorinated part $R_F$ and optionally an hydrogenated part $R_H$ not containing groups capable of linking to basic acceptors by means of hydrogen bonds, the bonds linking the fluorinated part, derived from (per)fluoropolyethers, to the hydrogenated part being of simple C—O ether type, the T' terminal groups being such as to render the structure bi- or polyfunctional thus making possible the curing reaction, and subsequent curing of the fluorinated polymer.

20 Claims, No Drawings

PROCESS FOR THE PROTECTION OF STONY OR COATING SURFACES

The present invention relates to a process for avoiding the decay effects on the usual building materials and coatings by the use of inks, spray or brush paints, coloured chalks, etc.

The damage caused by the decay of said materials is relevant especially on buildings of great artistic interest: besides an aestetic degradation there is generally an irreversible damage.

Methods used to clean surfaces from these graffiti are the following: a posteriori treatments and a priori treatments.

The a posteriori treatments of the treated surfaces essentially involve:
a) a coating thereof with paint;
b) an abrasive treatment;
c) washing attempts with solvents.

In any case the final result of any of such treatments leads to new clearly heterogeneous surfaces, cleaned surfaces different from the original ones, not stained surfaces. In particular it happens that:
a) the treatment by paint, which involves the application of a waterproof film, contravenes one of the main criteria to adopt for the preservation-protection of stone materials, that is, the maintenance thereon of the possibility to "breathe" with the result of possible medium-long term damages;
b) the abrasive treatment results in a real attack of the material and, even if possible and suitable, cannot obviously be carried out for repeated cleanings;
c) cleaning with solvent leads to soak the material with the solvent-paint mixture leaving clear and permanent stains.

To these inconveniences, the economic cost of these cleaning treatments is obviously to be added.

To obviate these drawbacks, a priori treatments are used by applying filming and not filming substances which hinder or make them more easily removable graffiti.

In Applicant's earlier Italian patent application No. MI94A001584, the prior art in the antigraffiti field was described and a composition allowing to overcome the drawbacks of the prior art was described.

In particular it was described that the use of organic polymeric products characterized by having a high number of carbon-hydrogen bonds, such as for instance silicone and acrylic resins, provided a partial solution to the problem. However, these polymers show some drawbacks due to their low stability to light and air pollution. See for silicone resins G. Biscontin et al work published in Atti del Convegno di Studi di Bressanone 24–27/11/1986, pg. 597.

Moreover the materials known in commerce have a further limitation: also those resulting more effective have not a high durability. In practice only one cleaning of the graffito is sufficient to remove also the protective treatment. For this reason there are too high costs which hinder an application thereof on industrial scale.

Improvements have been obtained by using perfluoropolyethers (PFPE) with perfluoroalkylic terminal groups. These polymers are effective when the material porosity is lower than 10%. See for instance Italian patent No. 1161595.

When the porosity is higher, it is known the use of perfluoropolyethers with functional terminal groups alone or, optionally, in admixture with tetrafluoroethylene, homo or copolymers, under the form of fine powders from 0.05 to 0.5 micron in amounts from 2 to 30% by weight; see Italian patent No. 1233420.

The advantage of PFPE-based protective agents resides in that they allow the absorbed water ato evaporate through capillarity from the underlying stone or coating material. However also these products cannot be industrially utilized since, although the graffito is easily removed from 90% of the treated surface, there are halos or stains left which change the aesthetic aspect of the underlying material and which require therefore an additional treatment of abrasive type for their removal. Therefore the same disadvantages occur as in the "a posteriori" cleaning indicated above.

In Applicant's Italian patent application No. MI94A001584 mentioned above, cured polymers based on (per)fluoropolyethers having hydroxilic polyfunctional terminal groups have been described. They make it possible to carry out an a priori treatment on the surface of the materials to be protected agaist graffiti and have a high durability without leaving either halos or stains and without modifying the surface of the treated material. The treated surface was resistant also to 10 cleaning operations wherefore frequent protective treatments of the surface could be avoided. This has clear practical advantages, both economic and industrial, however it requires high amounts of solvent with the relevant drawbacks related to their use and elimination. The Applicant has unexpectedly and surprisingly found that it is possible to utilize high dry compositions, wherein the amount of solvent is lower than 20% by weight, preferably lower than 5–10%, as described in the European patent application No. 95101145.1, as antigraffiti which give the same optimal results described in the above mentioned application MI94001548 but utilize lower amounts of solvents.

Also the products obtained by said European patent application are moreover suitable as compositions for use utilizable as antigraffiti by further reaction of the functional terminal groups. High dry products are obtained which have superior compatibility with crosslinking agents and pigments and contemporaneously result in transparent films with superior gloss, adhesion, hardness and folding resistance.

Object of the present invention is therefore the use as antigraffiti of cured fluorinated polymers based on fluoropolyethers in high dry formulation. The fluorinated polymer comprises a fluorinated part $R_F$ and optionally an hydrogenated part $R_H$, the bonds linking the fluorinated part, derived from (per)fluoropolyethers, to the hydrogenated one being of simple C—O ether type, the T' terminal groups being such as to render bi- or polyfunctional the structure, thus making possible the curing reaction, the hydrogenated part $R_H$ not containing groups capable of linking to basic acceptors by hydrogen bonds and subsequent curing of the fluorinated polymer.

More particularly are preferred the fluorinatd products according to the formula

 (I)

wherein
$R_F$ is

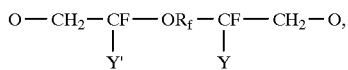

wherein $R_f$ is a fluoropolyether chain, where Y and Y' are equal to or different from each other and are F or $CF_3$
x is an integer from 1 to 10, preferably from 1 to 3;
$R_H$ is a linking bivalent radical of linear aliphatic —$(CH_2)_m$— type, wherein m is an integer from 1 to 20, or (alkylen)cycloaliphatic, (alkylen)aromatic optionally having also heteroatoms on the ring or in the chain, the number of carbon atoms of the cycloaliphatic compounds being from 3 to 20, for the aromatic compounds from 5 to 30; the $R_H$ group can be a combination of the indicated types;

T'=—(CH$_2$CH$_2$O)$_n$—(R$_H$)$_{x'}$—T, wherein n is an integer from 0 to 6, preferably from 1 to 2;

x' is an integer from 0 to 10, preferably from 1 to 3, x' being equal to or different from x; and T being hydrogen or a terminal group capable of making bi- or polyfunctional the structure as to render it reactive towards the curing agents both of ionic and radical type.

In particular the preferred end groups of T type are of the type:

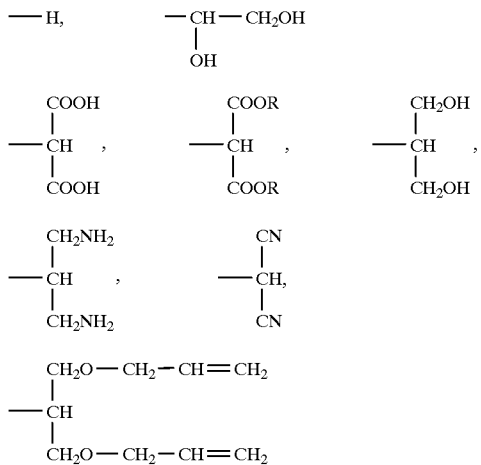

In particular groups which must be absent from the hydrogenated part $R_H$ are, for instance, —COOH, —NH—COO—; —NH—CO—NH—; —OH; —NH$_2$; —NH—; —CO—NH—.

The radical $R_f$ having molecular weight preferably comprised from 500 to 5000, more preferably from 700 to 1500, represents a fluoropolyether chain bifunctional radical comprising as repeating units sequences of one or more oxyfluoroalkylenic units of the —CF$_2$CF$_2$O—, —CR$_4$R$_5$CF$_2$CF$_2$O—,

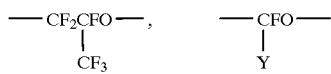

type.

wherein R$_4$, R$_5$, equal to or different from each other, are selected from H and Cl.

The fluorinated polymers of the present invention lead by addition of small amounts of solvent lead to the formation of solutions having a very low viscosity, generally of the order of 50–300 cPoise at room temperature. Amounts of solvents of the order of 2–3% by weight, selected from those generally utilized in the paints field, are sufficient to obtain solutions having extremely low viscosity as to make them easily utilizable.

The preferred compounds of the formula I are the following:

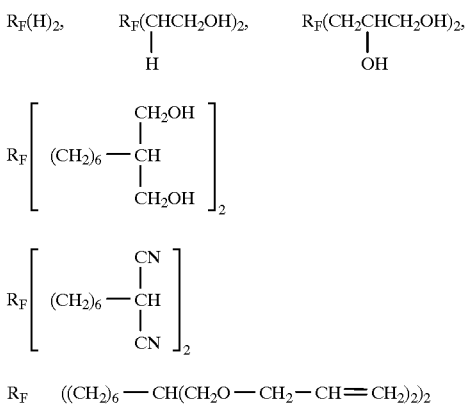

These products and the process for the preparation thereof are described in European patent application No. 95101145.1, incorporated herein by reference.

Also the products obtained from these fluorinated polymers before curing, as indicated above, are an object of the present patent application.

A further object of the present invention is the use as antigrafiti of cured fluorinated polymers based on fluoropolyethers in high dry curable formulations comprising a fluorinated part $R_F$ and optionally an hydrogenated part $R_H$, not containing groups capable of linking to basic acceptors by hydrogen bonds an hydrogenated part Rh$_1$ and Rh$_2$ wherein Rh$_1$ is equal to or different from Rh$_2$, and Rh$_1$ and/or Rh$_2$ being linking bonds containing at least a functional group capable of linking to basic acceptors by means of hydrogen bonds, the bonds linking the fluorinated part to the hydrogenated part being of simple C—O ether type, the terminal groups T'$_a$ and T" being such as to render mono-, bi- or polyfunctional the structure, and subsequent curing of the fluorinated polymer, the monofunctional products always being in admixture with a resin having a higher functionality also of the type described.

The preferred fluorinated products, pure or in admixture have the formula

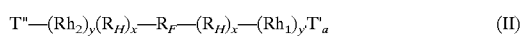

(II)

wherein

Rh$_1$ and Rh$_2$, equal to or different from each other, are linking bonds as $R_H$ but containing at least a functional group capable of linking to basic aceptors by hydrogen bonds;

y and y' equal to or different from each other, are integers from 0 to 1, at least one of the two being different from 0.

T'$_a$=—(CH$_2$CH$_2$O)$_n$—(R$_H$)$_{x'}$—T$_a$ wherein n is an integer from 0 to 6, preferably from 1 to 2;

T"=—(CH$_2$CH$_2$O)$_n$—(R$_H$)$_{x'}$—T$_b$, T$_a$ and T$_b$ being hydrogen or a reactive terminal group, capable of rendering the structure mono or polyfunctional such as to make the resin reactive towards the curing agents both of ionic and radical type, and T$_a$ being equal to or different from T$_b$ such that the T$_a$ and T$_b$ terminal groups are not all contemporaneously H.

The meaning of the other groups has already been reported.

In particular the preferred $T_a$ and $T_b$ terminal groups are:

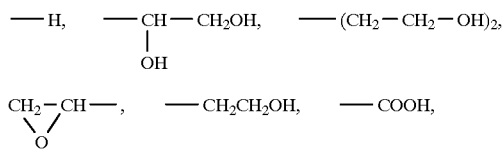

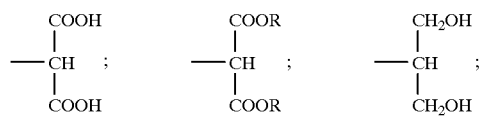

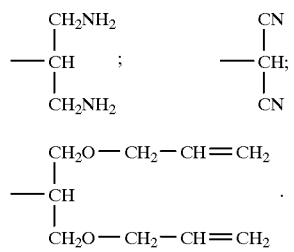

The preferred $Rh_1$ e $Rh_2$ groups are:

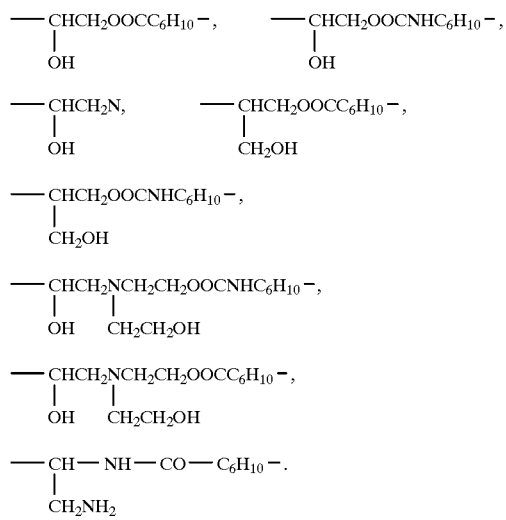

In particular, groups which must be absent from the hydrogenated part $R_H$ are, for instance, —COOH, —NH—COO—; —NH—CO—NH—; —OH; —NH$_2$; —NH—; —CO—NH—.

The fluorinated polymers described above are described in a previous patent application of the Applicant, Italian patent application No. MI94A000474, incorporated herein by reference. These fluorinated polymers by addition of amount of solvent lower than 30% by weight on the formulation, lead to the formation of solutions having extremely low viscosities, generally of the order of 100–150 cPoise at room temperature. In practice the high dry fluorinated polymers of the former European patent application No. 95101145.1 in the name of the Applicant, modified as indicated above, show a slight increase of the viscosity which is reduced by adding small amounts of solvent, generally lower than 10% by weight with respect to the formulations of the cited European application.

The preferred compound of formula II are the following:

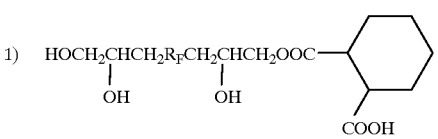

wherein:
$R_H$=—CH$_2$—, x=1, y=0
$Rh_1$=

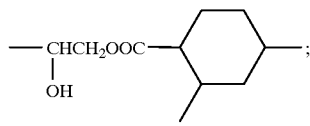

y'=1
$T_b$=

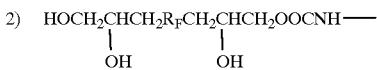

n=0 and x'=0;
$T_a$=—COOH;

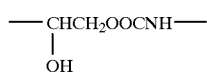

wherein:
$R_H$=—CH$_2$—, x=1, y=0
$Rh_1$=

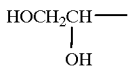

$T_a$=H, n=0 and x'=0
$T_b$=

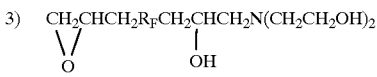

wherein:
$R_H$=—CH$_2$—, x=1
$Rh_1$=

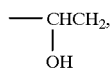

y'=1,
y=0,
n=0 and x'=0

$T_b =$

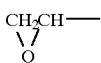

$T_a = -N(CH_2CH_2OH)_2$

Other preferred structures:

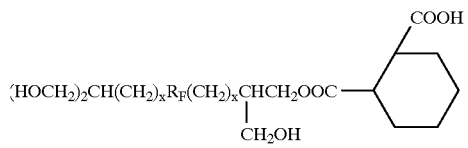

$R_H = -CH_2-$, x integer from 1 to 10,
$T_b = (HOCH_2)_2-CH-$
$y=0$
$y_1=1$
$Rh_1 =$

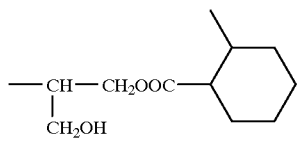

$T_a = -COOH;$

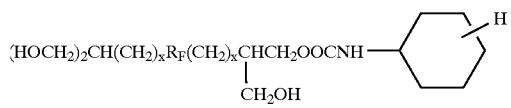

wherein the meaning is equal to the above structure with the difference that:
$Rh_1 =$

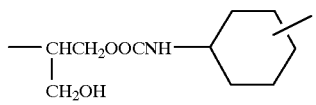

$T_a = H-;$

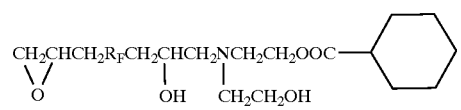

wherein
$R_H = -CH_2-$, x=1;
$T_b =$

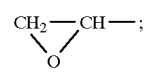

y'=1

$Rh_1 =$

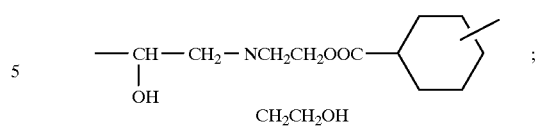

$T_a = H-;$

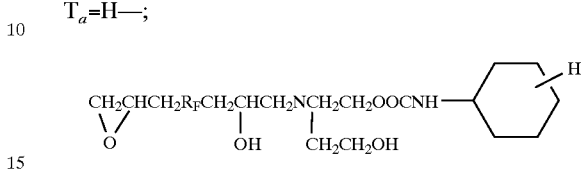

as the above formula wherein
$Rh_1 =$

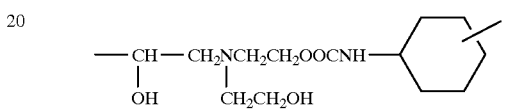

The solvents and crosslinking agents utilized with the fluorinated polymers of the present invention are indicated hereinafter.

The generally utilizable solvents are those widely employed in the paints field, they are, for instance: ketones, esters, heteroalcohols esters, alcohols, aromatics. Methylethylethylketone (MEK), methylisobutylketone (MIBK), ethyl or butyl acetate (ButAc), cellosolve acetate, propylenglycolmethylether acetate (PMA), xylene, halogen compounds containing hydrogen such as fluorocarbons HCFC, HFC and having fluoropolyether structure, are preferred. Chlorofluorocarbons not containing hydrogen are excluded as solvents.

The utilized crosslinking agents are the commercial ones and those anyway well known for curing curable functional groups. For instance polyhydroxylated products are curable with melaminic resins, with weight ratios comprised between 70:30 and 90:10, preferabaly 8:20, between polyhydroxylated compound and melamine; the curing temperature is around 130–150° C.

The obtained films are homogeneous, transparent and hydrolysis resistant.

Alternatively and preferably the polyhydroxylated polymers are curable with polyisocyanates containing isocyanurates rings, or utilizing suitable polyisocyanic prepolymers based on isoforondiisocyanate (IPDI), toluendiisocyanate (TDI), hexamethylendiisocyanate (HDI), etc. in the presence of metal or aminic catalysts, at room temperature or higher, by using a NCO/OH ratio for instance from 1/1 to 1.5/1.

Also blocked polyisocyanates, obtainable from the polyisocyanates indicated above by reaction, for instance, with phenols or ketoxime, can be used.

If the resin is radically curable peroxidic curing can be performed by using conventional organic peroxides, for instance di-ter-butylperoxide, lauroylperoxide, benzoylperoxide. Also other radical initiators not of peroxidic type can be used, such as AIBN (aza bisisobutyronitrile).

For the applications of the present invention as antigraffiti, curings occurring at room temperature are preferred. This is in particular true when protection of buildings is involved, in which case it is unadvisable to cure at high temperature considering the obvious practical difficulties. On the contray in case of handmade articles of limited sizes or of plates which can be treated in factory, curing can also be performed at high temperature.

In particular the fluoropolyethers of the $R_f$ type for use according to the present invention, generally of number average molecular weight $\overline{M}n$ between 500 and 7000, can be of the type, by indicating the repeating units of the chain:

a) $-(C_3F_6O)_{m'}-, -(CFYO)_{n'}-$ wherein the $(C_3F_6O)$ and (CFYO) units are perfluorooxyalkylenic units statistically distributed along the chain; m' and n' are integers such as to give the above indicated molecular weight and, when n' is different from 0, m'/n' is comprised between 5 and 40; X is equal to F or $CF_3$; n' can also be 0;

b)   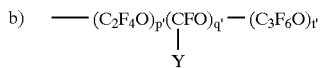

wherein p' and q' are integers such that p'/q' ranges between 5 and 0.3, preferably 2.7-0.5 and such that the molecular weight $\overline{M}n$ is in the range indicated above; t' is an integer with the meaning of m' and can also be 0; Y=F or $CF_3$; q'/q'+p'+t' is lower than or equal to 1/10 and the t'/p' ratio is from 0.2 to 6;

c) $-CR_4R_5-CF_2CF_2-O-$ wherein $R_4$ and $R_5$ are equal to or different from each other and selected from H, Cl, the molecular weight is in the range indicated above, a fluorine atom of the perfluoromethylene unit can be substituted by H, Cl or perfluoroalkyl having, for instance, 1–4 C atoms.

The indicated ($R_f$) fluoropolyethers are obtainable by the processes well known in the art, for instance, U.S. Pat. Nos. 3,665,041, 2,242,218, 3,715,378 and European patent EP 0239,123. The functionalized fluoropolyethers with $R_f$ chain are obtained for instance according to EP patent 148,482, U.S. Pat. No. 3,810.874, or according to EP patent application 95101145.1.

The functionalized fluoropolyethers of formulae I or II can be mixed among each other in various proportions or with other products of formulae I or II and/or with bi- or polyfunctional hydrogenated monomers or resins. Among the latter polyols are preferred, e.g. butandiol, trimethylolpropane, pentaerythrol, polycaprolactones, polyester or acrylic resins having low molecular weight. The ratio in equivalents between the monomer/hydrogenated resin with the fluorinated polymer of the invention ranges, generally, from 0.1 to 5, with the proviso that the formulation is an homogeneous solution. In this way blends are obtained having specific properties depending on the desired particular coating type.

The molar ratio between fluorinated resins of formula II and those of formula I is, for instance, from 10:1 to 1:10.

The process for preparing the fluorinated polymers of formula II consists in reacting the products of formula I with reactants capable of reacting with at least a reactive functional group of the terminal group T of the compound of formula I and with the stoichiometry such as to leave at least one of the reactive groups contained in the terminal groups T of formula I.

Particularly suitable reactants belong to the following classes:

anhydrides: aliphatic from 2 to 18 C atoms, for instance butyric anhydride, cycloaliphatic from 4 to 12 C atoms, hexahydrophthalic anhydride being preferred; aromatic from 8 to 12 C atoms, preferably phthalic anhydride;

acylic chlorides: from 2 to 18 carbon atoms; for instance butyryl chloride;

isocyanates: aliphatic having from 4 to 12 C atoms; preferably butyl isocyanate; cycloaliphatic having from 7 to 12 C atoms, preferably cyclohexyl isocyanate; aromatic having from 7 to 12 C atoms, preferably phenyl isocyanate;

halohydrins having from 3 to 12 C atoms, preferably epychlorohydrin, secondary amines $NHR_1R_2$, wherein $R_1$ and $R_2$ contain alcoholic functions, $R_1$ and $R_2$, equal to or different from each other, are aliphatic from 2 to 12 C atoms, preferably diethanol amine;

amino silanes $NH_2-R-Si(OR_1)_3$ with R and $R_1$, equal to or different from each other, aliphatic groups having from 1 to 10 C atoms, preferably γ-aminopropyltrimethoxysilane.

The process for preparing fluorinated polymers based on fluoropolyethers of formula I comprises:

etherification of the hydroxy-terminated fluoropolyether by its salification and nucleophilic reaction with alkylic or arylic dihalides or pseudohalides; a fluorinated polymer A') is obtained, whose formula corresponds to (I) wherein T' is replaced by X), in which the X end group is susceptible of further nucleophilic attack; subsequent functionalization by nucleophilic attack of A' with carboanion containing compounds to obtain the compound of formula corresponding to (I) containing the T terminal group, then optionally transformation of the functional T groups curable by reduction reaction or extension of chains with polyols, or ammonolysis or hydrolysis depending on the end group of the compound (I).

The hydroxy-terminated perfluoropolyethers, for instance of the $z^2$, $p^2$ and $A^2$ type, are obtainable according to known processes.

($A^2$)  $HO(CH_2CH_2O)_nCH_2CF_2O(CF_2CF_2O)_p(CF_2O)_qCF_2CH_2(OCH_2CH_2)_nOH$, wherein for instance p/q=1, and n=1.8 and having a number average molecular weight $\overline{M}n$ 1250 and functionality 1.95;

($Z^2$) $HOCH_2CF_2O(CF_2CF_2O)_p(CF_2O)_qCF_2CH_2OH$ having for instance p/q=0.77, $\overline{M}n$ 1000 and functionality 1.96;

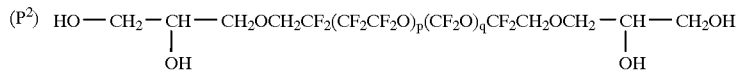

(see just as an indication example 1).

$Z^2$ is obtained for instance by reducing the corresponding diester according to U.S. Pat. No. 3,810,874; $A^2$ is obtainable by salification of $Z^2$ and reaction with ethylene oxide. Analogously the compounds with fluorooxyalkylenic units specified above are obtained for all the products of $Z^2$, $P^2$ an $A^2$ type.

The process for preparing products of formula (I) is reported in European patent application 95101145.1, those of formula (II) in Italian patent application MI 95A000474, both applications are herein incorporated by reference.

From the products of formula I thus obtained, as already said, the products of formula II are obtained by a partial transformation of the reactive functional groups of the T terminal groups to obtain $T_a$ and $T_b$ defined above.

For instance if T contains reactive groups of —OH type it is possible to carry out the reaction by condensation with anhydrides, acids, esters, acylic chlorides.

Depending on the stoichiometric ratio utilized between the compounds of formula I and the selected reactant, the resins of formula II can be directly obtained in admixture with the resins of formula I or mixtures of products of formula II. If the pure product of formula II is desired, this can be obtained directly by synthesis with the reactant, or by chemical/physical separation, for instance distillation or column chromatography or fractional precipitation.

If the T groups contain reactive groups of epoxydic type it is possible to obtain $T_a$ and $T_b$ for instance by reaction with nucleophiles, such as for instance primary or secondary amines, carboxylic acids in the presence of basic catalysts.

In Table IA are reported for illustrative but not limitative purposes some products of formula II starting from the resins of formula I to give $T_a$ and $T_b$.

| FLUORINATED RESIN | REACTANT | PRODUCT | |
|---|---|---|---|
| Z DOL ($A^{2)}$) | cyclohexane-1,2-dicarboxylic anhydride | $H-R_F-\overset{O}{\underset{\|}{C}}-$ cyclohexyl $-COOH$ | |
| Z DOL ($A^{2)}$) | $X-CH_2-CH(-O-)CH_2$ <br> X = Cl, Br, OTs, OMs | $H-R_F-CH(-O-)CH_2$ | (XI) |
| (XI) | $HN(CH_2CH_2OH)_2$ | $HR_F-CH_2-\overset{OH}{\underset{\|}{CH}}-CH_2-N-(CH_2CH_2OH_2)_2$ | (XII) |
| (XII) | cyclohexane-1,2-dicarboxylic anhydride | $HOOC-$cyclohexyl$-COR_FCH_2\overset{OH}{\underset{\|}{CH}}CH_2-N(CH_2CH_2OH)_2$ <br> + <br> $HR_F-CH_2-\overset{OH}{\underset{\|}{CH}}-CH_2-N\begin{pmatrix}CH_2CH_2-OOC-\text{cyclohexyl}-COOH\\CH_2CH_2OH\end{pmatrix}$ | |
| (XII) | cyclohexyl-NCO | cyclohexyl$-\overset{H}{\underset{\|}{N}}COR_F-CH_2-\overset{OH}{\underset{\|}{CH}}-CH_2-N-(CH_2CH_2OH)_2$ <br> + <br> $HR_F-CH_2-\overset{OH}{\underset{\|}{CH}}-CH_2-N\begin{pmatrix}CH_2CH_2-OOCNH-\text{cyclohexyl}\\CH_2CH_2OH\end{pmatrix}$ | |
| Z TETRAOL ($P^2$) | cyclohexane-1,2-dicarboxylic anhydride | $HO-CH_2-\overset{OH}{\underset{\|}{CH}}-CH_2-R_F-CH_2-\overset{OH}{\underset{\|}{CH}}-CH_2OOC-\text{cyclohexyl}-COOH$ | (IV) |
| Z TETRAOL ($P^2$) | cyclohexyl-NCO | $HO-CH_2-\overset{OH}{\underset{\|}{CH}}-CH_2R_F-CH_2-\overset{OH}{\underset{\|}{CH}}-CH_2OOC-\overset{H}{\underset{\|}{N}}-\text{cyclohexyl}$ | (V) |

-continued

| FLUORINATED RESIN | REACTANT | PRODUCT |
|---|---|---|
| Z EPOX (VI) | $NH(CH_2CH_2OH)_2$ | $CH_2\overset{O}{\underset{}{\diagdown\!\!\diagup}}CH-CH_2-R_F-CH_2-\underset{OH}{\overset{}{C}H}-CH_2-N(CH_2CH_2OH)_2$ (VII) |
| (VII) | cyclohexyl-NCO | $CH_2\overset{O}{\underset{}{\diagdown\!\!\diagup}}CH-CH_2-R_F-CH_2-\underset{OH}{\overset{}{C}H}-CH_2-N\begin{matrix}CH_2CH_2OOC-NH-\text{cyclohexyl}\\CH_2CH_2OH\end{matrix}$ |
| Z EPOX (VI) | $H_2N(CH_2)_4-Si(OCH_3)_3$ | $(OCH_3)_3-Si-(CH_2)_4-NH-CH_2-\underset{OH}{\overset{}{C}H}-CH_2-R_F-CH_2-\underset{OH}{\overset{}{C}H}-CH_2NH(CH_2)_4Si(OCH_3)_3$ |
| Z TETRAOL ($P^2$) | $CH_2=\underset{CH_3}{\overset{}{C}}-CO-NCO$ | $CH_2=\underset{CH_3}{\overset{}{C}}-CO-NH-CO-OCH_2-\underset{OH}{\overset{}{C}H}-CH_2R_F-CH_2-\underset{OH}{\overset{}{C}H}-CH_2-O-CO-NH-CO-\underset{CH_3}{\overset{}{C}}=CH_2$ |
| Z TETRAOL ($P^2$) | cyclohexyl-COCl | $HOCH_2-\underset{OH}{\overset{}{C}H}-CH_2-R_F-CH_2-\underset{OH}{\overset{}{C}H}-CH_2OOC-\text{cyclohexyl}$ |

To the obtained paint the usual additives such as pigments and fillers can be added; the latter must be produced inert, that is they must not contain groups reactive towards the terminal groups of the product of formula (I) or (II).

The pigments and the fillers serve to improve the surface characteristics, such as consistency, hardness and moisture resistance, colour stability, etc., of the paint after spreading and drying on the treated surface.

The pigments can be selected from the natural, synthetic inorganic and synthetic organic pigments. As example of inorganic pigments it can be mentioned: metal oxides: titanium dioxide, iron oxides, mixed oxides of Ni, Co, Zn, Ti or Cu, Cr or Fe, Ni, Cr, Mn, cobalt aluminates; organic pigments; derivatives from anthraquinone, quinacridone, tetrachloroisoindolinone, diketo-perylene, phthalocyanines, etc.

The fluorinated products utilized for preparing the paints object of the present invention are sufficiently fluorinated to be compatible with fillers such as polytetrafluoroethylene, polyfluoroethylene-propylene, etc.. These fillers can be added in high amounts such as, for instance, up to 50% by weight. The fillers, as well as inert pigments and any other type of additive, are added to the dispersion in very fine form, generally with sizes lower than 100 microns. Other examples of fillers are: colloidal silica, polyamides having sizes 20–100 μm, glass spheres such as zeolites, etc; other additives are for instance: thixotropic agents, acrylic, silicone, polyurethane, polyaminic dispersants or with carboxylic or non ionic functionality; stretching, anticissing, antistatic, antifoam additives, etc.; additives to reduce photooxidation; UV adsorber (for ex. hydroxybenzophenones, hydroxybenzotriazol derivatives, etc.) and HALS (hindered amines such as tetramethyl-piperidine derivatives, etc.).

The paints object of the present invention are characterized by high water-repellence, low surface critical tension and low friction coefficient.

The amount of fluorinated products of the invention to be applied on the surfaces to be protected ranges depending on the material to be treated, in particular depending on its porosity. Higher amounts are obviously used for porous materials. Amounts comprised between 10 and 50 g/m² of surface to be treated are usually used.

The application of the paints to the surfaces of the material or manufactured article to be protected can be carried out with any technique usually employed for such purpose: by brush, or by a compressed air gun and by a spray method.

The curing of the paints of the present invention is carried out preferably at room temperature for a sufficient time to obtain curing.

The following examples are given only for illustrative purposes but are not limitative of the scope of the present invention.

EXAMPLE 1A

Preparation of the Products of Formula I 100 g of a fluoropolyether of formula:

having p/q=0.84, n=O, $\overline{M}n$ 950 (number average molecular weight) and functionality 1.93 are loaded in a 4 necks glass flask equipped with dropping funnel, thermometer, refrigerant and mechanical stirrer; the internal temperature is brought to 70° C.

1.14 g of potassium diterbutylate are added under nitrogen, a solution is obtained.

After 15 minutes 15.82 g of glycidol

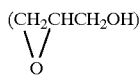

are dropped, the reaction mixture is maintained at 70° C. for other 4 hours.

It is cooled and acidified with aqueous HCl, the salts are removed by filtering and water is eliminated by distillation at 100° C. under vacuum.

102 g of a product are obtained which on the basis of the analysis results to be:

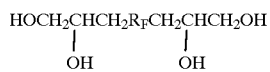
(P²)

In accordance with the structure reported above the hydroxylic equivalent weight, determined by $^{19}F$ NMR analysis results to be 280. The viscosity results to be at 20° C. of 2500 cPs.

EXAMPLE 1B

Preparation of Epoxy-Terminated Products of Formula (II)

100 g of fluoropolyether diol of formula $A^2$ (of Example 1A) are added to a solution containing 23.95 g of potassium terbutylate in 150 ml of terbutanol under nitrogen.

The resulting solution is then added in 4 hours, by means of the dropping funnel, to an epibromidrine solution (100 g) in 20 ml of terbutanol at 70° C. When the pH of the solution becomes neutral, it is cooled, the salt is removed by filtering and the reaction solvent is distilled, then the excess of epibromidrine is eliminated under vacuum at 80° C.

102 g of a product of formula (VI):

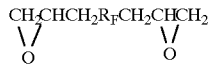
(VI)

are thus recovered, containing oligomeric products in amounts lower than 5% by weight; the epoxy equivalent weight is 550 and the viscosity is 120 cPs at 20° C.

The fluorinated resin of formula (VI) is formulated with the polyamine, for instance DETA (diethylentriamine) $NH_2CH_2CH_2NH—CH_2CH_2NH_2$ and cured.

A transparent film of good adhesion and hardness is obtained.

100 g of the product of formula (VI) are mixed to 30 ml of anhydrous isopropanol and to 10.1 g of diethanolamine previously anhydrified under vacuum at 90° C. for 2 hours.

Such mixture is heated to 80° C. for 6 hours in a 3 necks reactor equipped with thermometer, refrigerant and mechanical stirrer.

The reaction product results to be formed by the starting product (VI) (22%), by the ammine mono adduct (VII) (56%) and by the bisadduct (VIII) (22%), by column chromatographic separation the two addition products of formula:

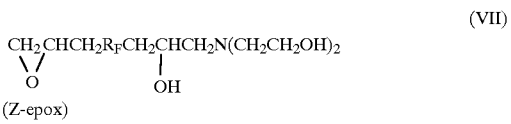
(Z-epox)

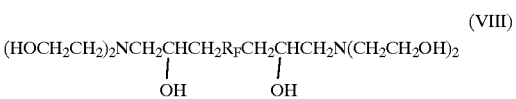
(VIII)

are isolated.

The product (VII) has an epoxy equivalent weight of 1150, an hydroxylic equivalent weight of 350 and a viscosity of 1100 cPs at 20° C.

The product of formula (VIII) has an hydroxylic equivalent weight of 285 and a viscosity at 25° C. of 8000 cPs.

EXAMPLE 1

The formulation based on fluorinated polymers of the class of type I, formula I, ZDOL of example 1A having average molecular weight 950 and hydroxyl functionality 1.93, described in table 1, was spray applied (nozzle 1.2 mm, 3 atm) on cement samples polypropylene loaded Cembonit of the company SIL (density 1.4 kg/dm³, max absorption of water 30% by weight) in amounts corresponding to about 100 g/m².

TABLE 1

|  | g | dry component g |
|---|---|---|
| ZDOL | 45.2 | 45.2 |
| Polurene MC (Sapici) (60% in PMA/ButAc 30/70) | 49.3 | 29.6 |
| DETDL (25% in ButAc) | 1 | 0.25 |
|  | 95.5 | 75.05 |

Polurene MC = adduct of the trimethylolpropane with isophorondiisocyanate
% total dry = 78.6%

The film was cured at room temperature for at least 48 hours, the curing agent is Polurene MC.

After this time, the test surfaces were stained with commercial products as indicated herein: solvent acrylic spray paints (Dupli Color) of black, red and blue colour, nitro paints (Color Matic) of red and green colour, solvent fluorescent paints (Dupli Colour Fluo), water acrylic paints (Dupli Color Aqua Lack) of black colour, all produced by Vogelsang (Cesano Boscone, Milano).

The graffiti cleanness was then evaluated after 24 hours and 7 days of drying using paper soaked in the following solvents:

ethanol (EtOH)
n-methylpyrrolidone/Triton X100 (99,9/0.1) (MePy)
mixture of toluene/xylene/MEK/ethyleneglycol/isopropanol (28/13/10/2/47) (MIX)
Nitro solvent (nitro Sov.).

The obtained results (Table 2) are the same for the cleanness carried out after 24 hours and 7 days.

In the tables the meaning is the following:
Yes easy removal of the graffito without removing the coating
Off complete removal of the coating swell removal of the graffito with coating swelling

TABLE 2

|  | EtOH | Nitro solv. | n-MePy | Mix |
|---|---|---|---|---|
| Acrylic solvent (black/red/blue) | yes | yes | yes | yes |
| Nitro (red/green) | yes | yes | yes | yes |
| Acrylic water (black) | yes | yes | yes | yes |
| Fluorescent | yes | yes | yes | yes |

In all cases even if the coating tends to soften upon contact with the solvent, after its evaporation the original situation is reinstated.

EXAMPLE 2

The formulation of Example 1 was spray applied (nozzle 1.2 mm, 3 atm) on asbestos cement samples of Example 1 in amount corresponding to about 100 g/m$^2$.

The film was cured as in Example 1.

After this time, the tests surfaces were stained with commercial indelible marking pens of different colours with a fine tip, black Staedtler marking pens with a thick tip and rechargeable Marker marking pens.

The graffiti cleanness was then evaluated after 24 hours and 7 days of drying by utilizing paper soaked in the following solvents:
ethanol
nitro solvent.

The obtained results (Table 3) are the same for the cleanness carried out after 24 hours and 7 days.

TABLE 3

|  | EtOH | Nitro solv. |
|---|---|---|
| Stabilo marking pens | yes | yes |
| Staetdler marking pens | yes | yes |
| Marker marking pens | yes | yes |

EXAMPLE 3

The tests of example 1 stained with solvent acrylic and nitro paints, were put in stove at 40° C. for 3 days to simulate an accelerated ageing and then cleaned with paper soaked in ethanol. All the samples were cleaned with the same easiness of the tests not aged in stove.

EXAMPLE 4

The tests of example 1 stained with solvent acrylic and nitro paints, were submitted to subsequent cycles of staining/cleanness with ethanol to evaluate the removal resistance of the fluorinated film. The formulation even after 15 cycles of staining/cleanness results undamaged.

EXAMPLE 5 (comparative)

A commercial antigraffiti paint Silko 31.70 (Chembau) was brush applied on cement tests polypropylene loaded CEM-BONIT® by the company SIL (density 1.4 Kg/dm$^3$, max water absorption 30% by weight) in amount corresponding to about 100 g/m$^2$.

The film was cured as in Example 1 at room temperature for at least 48 hours. This time elapsed, the tests surfaces were stained with commercial paints: solvent acrylic spray paints (Dupli Color) of black, red and blue colour, nitro paints (Color Matic) of red and green colour, solvent fluorescent paints (Dupli Colour Fluo), water acrylic paints (Dupli Color Aqua Lack) of black colour, all produced by Vogelsang (Cesano Boscone, Milano).

The graffiti cleanness was then evaluated after 24 hours and 7 days of drying using paper soaked in the following solvents:
ethanol
n-methylpyrrolidone/Triton X100 (99.9/0.1)
mixture of toluene/xilene/MEK/ethyleneglycol/isopropanol (28/13/10/2/47).

The obtained results (Table 4) are the same for the cleanness carried out after 24 hours and 7 days.

TABLE 4

|  | EtOH | n-MePy | Mix |
|---|---|---|---|
| Acrylic solvent (yellow) | off | off | off |
| Nitro (red) | off | off | off |
| Acrylic water (black) | yes | yes | yes |
| Fluorescent | yes | swell | swell |
| Metallized | off | off |  |

EXAMPLE 6

The formulation of Example 1 was spray applied (nozzle 1.2 mm, 3 atm) on sinthetic skin tests in amount corresponding to about 40 g/m$^2$ without an appreciable stiffening of the surface.

The film was cured as in Example 1.

After this time, the tests surfaces were stained with commercial indelible marking pens of different colours with a fine tip, black Staedtler marking pens with a thick tip and rechargeable Marker marking pens.

The graffiti cleanness was then evaluated after 24 hours and 7 days of drying by utilizing paper soaked in ethanol.

The obtained results (Table 5) are the same for the cleanness carried out after 24 hours and 7 days.

TABLE 5

|  | EtOH |
|---|---|
| Stabilo marking pens | yes |
| Staetaler marking pens | yes |
| Marker marking pens | yes |

EXAMPLE 7

The formulation based on fluorinated polymers of the class belonging to formula II, epoxy derivative prepared according to example 1B, Z-epox of formula VII, was spray applied (nozzle 1.2 mm, 3 atm) on aluminium tests in amount corresponding to about 40 g/cm$^2$.

TABLE 6

|  | g | dry component g |
|---|---|---|
| Z epoxy drivative | 40.4 | 40.4 |
| Polurene MC (Sapici) (60% in PMA/ButAc 30/70) | 45.5 | 27.3 |
| Dibutyltindilaurate 25% in BuAc | 0.54 | 0.14 |
|  | 86.44 | 67.84 |

% total dry = 78%

The film was cured at room temperature for at least 48 hours. This time elapsed, the test surfaces were stained with commercial paints: solvent acrylic spray paints (Dupli Color) of black, red and blue colour, nitro paints (Color Matic) of red and green colour, solvent fluorescent paints (Dupli Colour Fluo), water acrylic paints (Dupli Color Aqua Lack) of black colour, all produced by Vogelsang (Cesano Boscone, Milano) and with indelible Stabilo marking pens of different colours with a fine tip, black Staedtler marking pens with a thick tip and rechargeable Marker marking pens.

The graffiti cleanness was then evaluated after 24 hours and 7 days of drying using paper soaked in the following solvents:
ethanol
nitro solvent.

The obtained results (Table 7) are the same for the cleanness carried out after 24 hours and 7 days.

TABLE 7

|  | EtOH | Nitro solv. |
|---|---|---|
| Acrylic solvent (black/red/blue) | yes | yes |
| Nitro (red/green) | yes | yes |
| Acrylic water (black) | yes | yes |
| Fluorescent | yes | yes |
| Stabilo marking pens | yes | yes |
| Staedtler marking pens | yes | yes |
| Marker marking pens | yes | yes |

EXAMPLE 8

The formulation based on fluorinated polymers of Example 1A Z DOL having number average molecular weight 950 and hydroxyl functionality 1.93, and of the class of Z TETRAOL (p² of example 1A) having number average molecular weight 1065 and hydroxyl equivalent weight 280, described in Table 8, was spray applied (nozzle 1.2 mm, 3 atm) on aluminium tests in amount corresponding to about 40 g/m².

TABLE 8

|  | g | dry component g |
|---|---|---|
| Z DOL | 21.11 | 21.11 |
| Z TETRAOL | 21.11 | 21.11 |
| Polurene MC (Sapici) (60% in PMA/ButAc 30/70) | 55.24 | 33.14 |
| Dibutyltindilaurate | 2.53 | 0.63 |
|  | 99.99 | 75.99 |

% total dry = 76%

The film was cured as in Example 1 at room temperature for at least 48 hours. This time elapsed, the test surfaces were stained with commercial paints: solvent acrylic spray paints (Dupli Color) of black, red and blue colour, nitro paints (Color Matic) of red and green colour, solvent fluorescent paints (Dupli Colour Fluo), water acrylic paints (Dupli Color Aqua Lack) of black colour, all produced by Vogelsang (Cesano Boscone, Milano) and with indelible Stabilo marking pens of different colours with a fine tip, black Staedtler marking pens with a thick tip and rechargeable Marker marking pens.

The graffiti cleanness was then evaluated after 24 hours and 7 days of drying using paper soaked in the following solvents:
ethanol
nitro solvent.

The obtained results (Table 9) are the same for the cleanness carried out after 24 hours and 7 days.

TABLE 9

|  | EtOH | Nitro solv. |
|---|---|---|
| Acrylic solvent (black/red/blue) | yes | yes |
| Nitro (red/green) | yes | yes |
| Acrylic water (black) | yes | yes |
| Fluorescent | yes | yes |
| Stabilo marking pens | yes | yes |
| Staedtler marking pens | yes | yes |
| Marker marking pens | yes | yes |

We claim:

1. A method of protecting objects from graffiti comprising:

applying to a surface of a material to be treated a formulation comprising less than 20% solvent and a fluorinated polymer wherein the fluorinated polymer comprises a fluorinated part $R_F$ and optionally a hydrogenated part $R_H$, not containing groups capable of linking to basic acceptors by hydrogen bonds, a hydrogenated part $Rh_1$ and $Rh_2$, wherein $Rh_1$ is equal to or different from $Rh_2$, and $Rh_1$ and $Rh_2$ are linking bonds containing at least a functional group capable of linking to basic acceptors by means of hydrogen bonds, the bonds linking the fluorinated part to the hydrogenated part being of simple C—O ether type, the terminal groups $T'_a$ and T'' being such as to render the structure mono-, bi-, or polyfunctional, the monofunctional products always being in admixture with a resin having a higher functionality; and curing the fluorinated polymer to create a graffiti resistant protective coating.

2. The method according to claim 1, wherein the fluorinated polymer has the formula

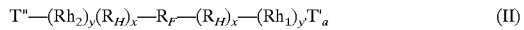

wherein $Rh_1$ and $Rh_2$, equal to or different from each other, are linking bonds containing at least a functional group capable of linking to basic acceptors by hydrogen bonds;

x is an integer from 1 to 10;

y and y' equal to or different from each other, are integers from 0 to 1, at least one of the two being 1;

$T'_a$=—$(CH_2CH_2O)_n$—$(R_H)_{x'}$—$T_a$ wherein n is an integer from 0 to 6, and x' is an integer from 1–10;

$T''$=—$(CH_2CH_2O)_n$—$(R_H)_{x'}$—$T_b$ $T_a$ and $T_b$ being hydrogen or a reactive terminal group, capable of rendering the structure mono or polyfunctional such as to make the resin reactive towards the curing agents both of ionic and radical type, and $T_a$ being equal to or different from $T_b$ such that the $T_a$ and $T_b$ terminal groups are not all contemporaneously H.

3. The method of claim 2, wherein n is an integer from 1 to 2.

4. The method of claim 1, wherein $T_a$ and $T_b$ are selected from the group consisting of:

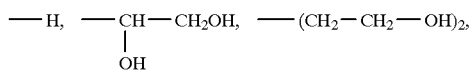

-continued

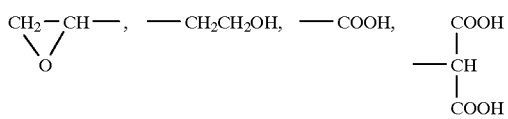

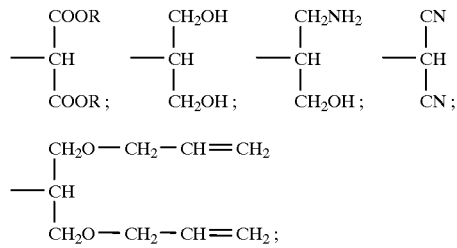

and the $Rh_1$ and $Rh_2$ groups are selected from the group consisting of:

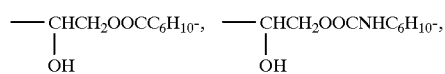

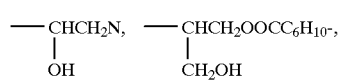

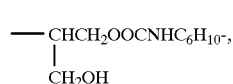

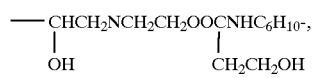

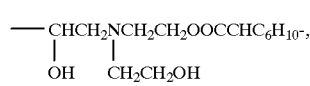

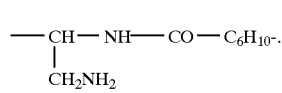

5. The method of claim 1, wherein the fluorinated polymer is selected from the group consisting of:

1)

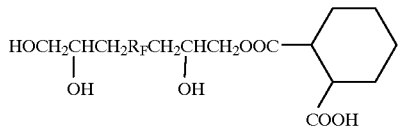

where:

$R_H$=—$CH_2$—, x=1, y=0
$Rh_1$=

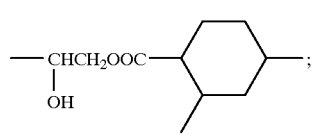

y'=1

$T_b$=

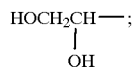

n=0 and x'=0;
$T_a$=—COOH;

2)

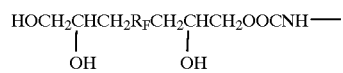

where:
$R_H$=—$CH_2$—, x=1, y=0
$Rh_1$=

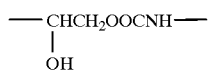

$T_a$=H, n=0 and x'=0
$T_b$=

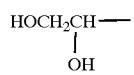

3)

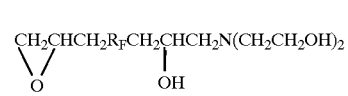

where:
$R_H$=—$CH_2$—, x=1
$Rh_1$=

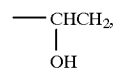

y'=1,
y=0,
n=0 and x'=0
$T_b$=

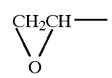

$T_a$=—N($CH_2CH_2OH$)$_2$;

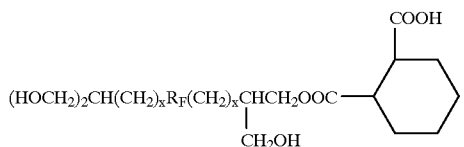

$R_H$=—$CH_2$—, x being an integer from 1 to 10,
$T_b$=(HOCH$_2$)$_2$—CH— y=0
y₁=1
Rh₁=

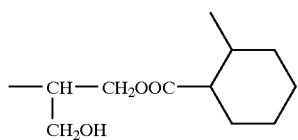

T_a=—COOH;

5) (HOCH₂)₂CH(CH₂)ₓR_p(CH₂)ₓCHCH₂OOCNH— 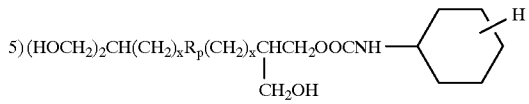

wherein

R_H=—CH₂—, x being an integer from 1 to 10,
T_b=(HOCH₂)₂—CH—,
y=0,
y₁=1
Rh₁=

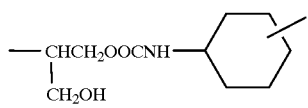

T_a=H—;

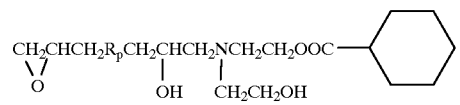

wherein:
R_H=—CH₂—, x=1;
T_b=

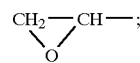

y'=1
Rh₁=

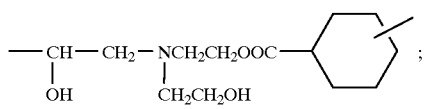

T_a=H—;

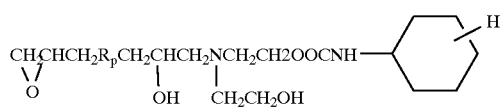

as the above formula wherein

Rh₁=

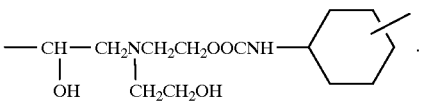

6. The method of claim 1, wherein the radical R_f has a molecular weight comprised from 500 to 5000 and represents a fluoropolyether chain bifunctional radical comprising as repeating units sequences of one or more oxyfluoroalkylenic units of the

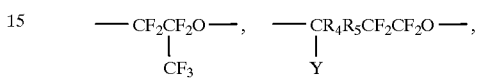

—CF₂CFO—, and —CFO— type:

wherein R₄, R₅, equal to or different from each other, are selected from H and Cl.

7. The method according to claim 6, wherein R_f is selected from:

(a) —(C₃F₆O)_{m'}(CFYO)_{n'}—
   wherein the (C₃F₆O) and (CFYO) units are perfluorooxyalkylenic units statistically distributed along the chain; m' and n' are integers and, when n' is different from 0, m'/n' is comprised between 5 and 40; X is equal to F or CF₃;

(b)

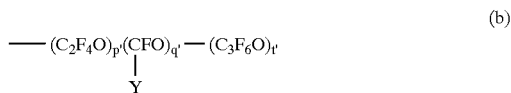

wherein p' and q' are integers such at p'/q' ranges between 5 and 0.3, t' is an integer, Y=F or CF₃, q'/q'+p'+t' is less than or equal to 1/10 and the t'/p' ratio is from 0.2 to 6; and (c) —CR₄R₅—CF₂CF₂—O—
   wherein R₄ and R₅ are equal to or different from each other and selected from H, Cl, a fluorine atom of the perfluoromethylene unit can be substituted by H, Cl or perfluoroalkyl.

8. A method of protecting objects from graffiti comprising:

applying to a surface of a material to be treated a formulation comprising less than 20% solvent and a fluorinated polymer wherein the fluorinated polymer comprises a fluorinated part R_F derived from (per)fluoropolyethers and optionally an hydrogenated part R_H not containing groups capable of linking to basic acceptors by hydrogen bonds, the bonds linking the fluorinated part to the hydrogenated part being of simple C—O ether type, the terminal groups T' being such as to render the structure bi- or polyfunctional; and curing the fluorinated polymer to create a graffiti resistant protective coating.

9. The method of claim 8, wherein the fluorinated polymers before curing have the formula T'—(R_H)_x—R_F—(R_H)_x—T'     (I)

wherein $R_F$ is

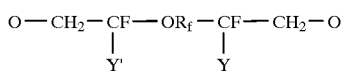

wherein $R_f$ is a fluoropolyether chain, where Y and Y' are equal to or different from each other and are F or $CF_3$;

x is an integer from 1 to 10;

$R_H$ is a linking bivalent radical of linear aliphatic $—(CH_2)_m—$type wherein m is an integer from 1 to 20, or (alkylen)cycloaliphatic, (alkylen)aromatic optionally having also heteroatoms on he ring or in the chain, the number of carbon atoms of the cycloaliphatic compounds being from 3 to 20, for the aromatic compounds from 5 to 30; the $R_H$ group being a combination of:

T'=$—(CH_2CH_2O)_n—(R_H)_{x'}—T$, wherein n is an integer from 0 to 6;

x' is an integer from 0 to 10; and

T being hydrogen or a terminal group capable of making bi- or polyfunctional the structure so as to render it reactive towards the curing agents of both of ionic and radical type.

10. The method according to claim 9 wherein the end groups of T are:

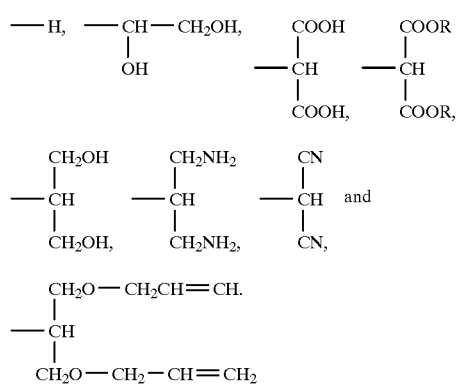

11. The method according to claim 9, wherein x is an integer from 1 to 3.

12. The method of claim 9, wherein x' is an integer from 1 to 3.

13. The method of claim 9, wherein n is an integer from 1 to 2.

14. The method of claim 8, wherein the radical $R_f$ having a number average molecular weight comprised from 500 to 5000 represents a fluoropolyether chain bifunctional radical comprising as repeating units sequences of one or more oxyfluoroalkylenic units of the formula

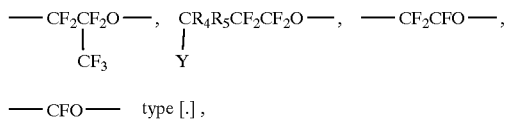

wherein $R_4$, $R_5$, are equal to or different from each other, and are selected from H and Cl.

15. The method according to claim 14, wherein $R_f$ is selected from:

(a) $—(C_3F_6O)_{m'}(CFYO)_{n'}—$ wherein the $(C_3F_6O)$ and (CFYO) units are perfluorooxyalkylenic units statistically distributed along the chain; m' and n' are integers and, when n' is different from 0, m'/n' is comprised between 5 and 40; X is equal to F or $CF_3$;

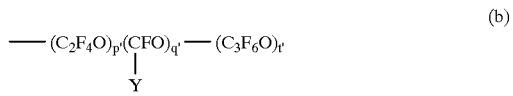

wherein p' and q' are integers such at p'/q' ranges between 5 and 0.3, t' is an integer, Y=F or $CF_3$, q'/q'+p'+t' is less than or equal to 1/10 and the t'/p' ratio is from 0.2 to 6; and (c) $—CR_4R_5—CF_2CF_2—O—$ wherein $R_4$ and $R_5$ are equal to or different from each other and selected from H, Cl, a fluorine atom of the perfluoromethylene unit can be substituted by H, Cl or perfluoroalkyl.

16. The method according to claim 15, wherein a fluorine atom of the perfluoromethylene unit is substituted by perfluoroalkyl having 1–4 C atoms.

17. The method of claim 15, wherein the ratio of p'/q' is 2.7-0.5.

18. The method of claim 15, wherein n' is equal to 0.

19. The method of claim 15, wherein t' is equal to 0.

20. The method according to claim 8, wherein the fluorinated polymer is selected from the group consisting of:

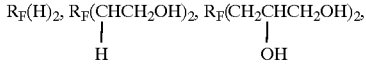

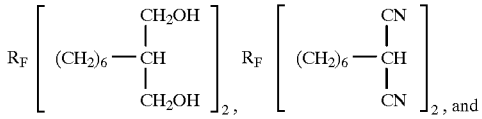

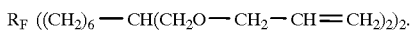

UNITED STATES PATENT AND TRADEMARK OFFICE
CERTIFICATE OF CORRECTION

PATENT NO. : 5,948,478
DATED : Sept. 7, 1999
INVENTOR(S) : Daria Lenti

It is certified that error appears in the above-identified patent and that said Letters Patent is hereby corrected as shown below:

Claim 5, column 23, lines 60-65:

" 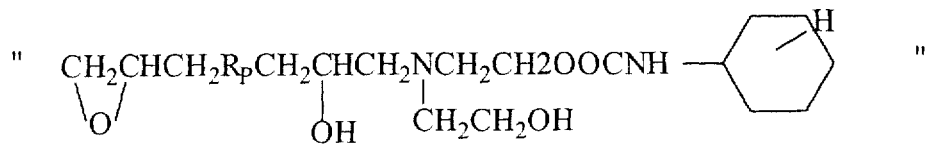 "

should read

-- 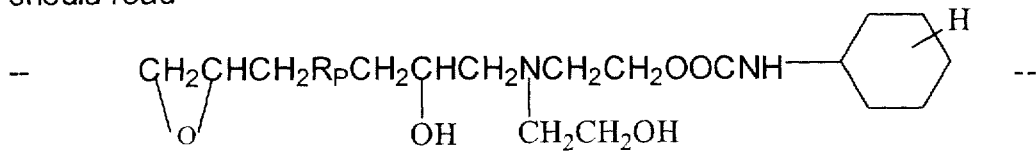 --

UNITED STATES PATENT AND TRADEMARK OFFICE
CERTIFICATE OF CORRECTION

PATENT NO. : 5,948,478
DATED : Sept. 7, 1999
INVENTOR(S) : Daria Lenti

It is certified that error appears in the above-identified patent and that said Letters Patent is hereby corrected as shown below:

Claim 7, column 24, line 39, "such at" should read --such that--.
Claim 9, column 25, line 14, "he" should read --the.
Claim 14, column 25, line 56, "formula" should read --formula:--;
Claim 14, column 26, line 5, "type[.]," should read --type,--
Claim 15, column 26, line 25, "such at" should read --such that--.

Signed and Sealed this

Fourteenth Day of March, 2000

Attest:

Q. TODD DICKINSON

Attesting Officer

Commissioner of Patents and Trademarks